Patented Aug. 23, 1949

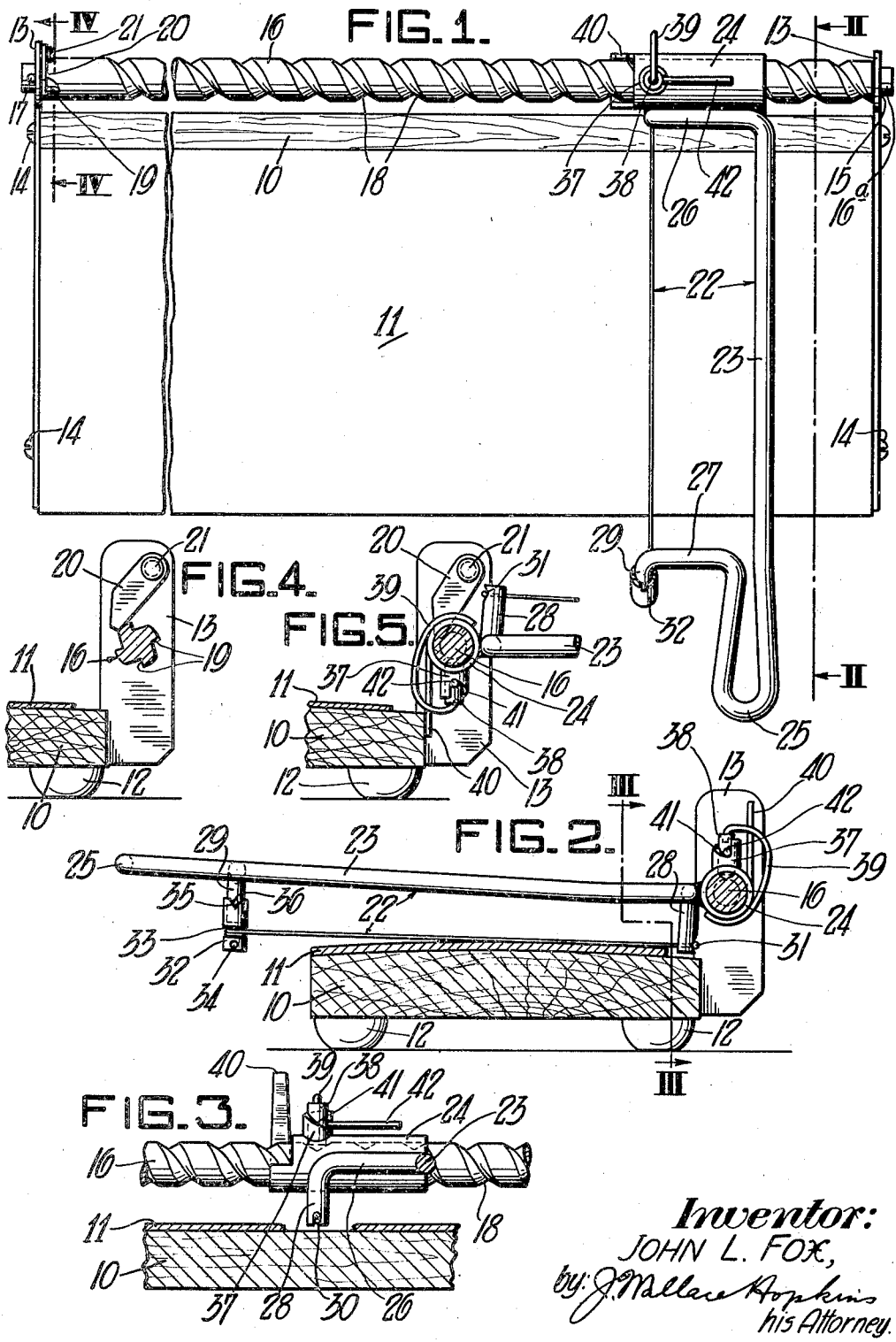

2,479,676

UNITED STATES PATENT OFFICE 2,479,676

FOOD CUTTER WITH SWINGING KNIFE AND AUTOMATIC SCREW FEED

John L. Fox, Port Vue, Pa., assignor of one-half to Michael P. De Felice, Port Vue, Pa.

Application February 16, 1948, Serial No. 8,597

7 Claims. (Cl. 31—28)

This invention relates to a kitchen appliance and, in particular, to a device having a manually operable swinging knife for cutting articles of food such as cheese, butter, fruit or vegetables into slices of uniform thickness.

Many types of devices for slicing various articles of food have been proposed heretofore but all those with which I am familiar are open to certain objections and subject to serious shortcomings. One of those including a manually operable swinging knife has a manually operable feed screw thus requiring both hands to operate it and making it impossible for the user to hold either the device or the article being sliced. In another, the knife has to be advanced by hand after each cut so that there is no uniformity in the thickness of successive slices. It is the object of my invention, therefore, to provide a cutter operable with ease by one hand and having an automatic screw feed effective to advance the knife a predetermined amount after each cutting operation.

In a preferred embodiment, I provide a base adapted to support the article being sliced, having a feed screw in the form of a threaded shaft journaled along one side thereof. A knife having an eye or sleeve slidable and rotatable on the screw extends over the base and is fitted with a cutting member stretched taut under tension. A follower is fitted in the sleeve for cooperation with the thread of the screw. The screw is provided with a non-return locking mechanism effective after limited rotation thereof with the knife as it is swung upwardly. The friction of the follower on the screw causes the latter to turn with the knife as the latter is swung upwardly after making a cut until the locking mechanism becomes effective. Thereafter, continued angular movement of the knife in the upward direction causes the eye or sleeve to travel along the screw by reason of the engagement of the follower in the thread thereof.

Further novel features, details and advantages of the invention will become apparent as the following complete description proceeds, by reference to the accompanying drawings illustrating the preferred embodiment. In the drawings, Figure 1 is a plan view;

Figure 2 is a transverse section taken along the plane of line II—II of Figure 1;

Figure 3 is a partial longitudinal section taken along the line III—III of Figure 2, with parts in elevation;

Figure 4 is a partial transverse section taken along the plane of line IV—IV of Figure 1 with parts in elevation; and Figure 5 is a partial view similar to Figure 2 showing the parts in alternative positions.

Referring now in detail to the drawings, the device of my invention comprises a base 10 having a metal sheathing 11 extending over the top thereof providing a work-supporting surface adapted to co-operate with a cutting element hereafter described. The base is preferably fitted with non-marring feet 12 of rubber or other suitable cushioning material. Angle brackets 13 are secured to the ends of the base as by screws 14 and have bearings 15 in which a threaded shaft or screw 16 is journaled. As clearly shown in the drawings, the shaft extends longitudinally of the base adjacent the rear edge thereof at a level slightly thereabove. The ends of the shaft are reduced at 16a where they enter the bearings and a cotter pin 17 inserted through a hole in one end keeps it in place. The reduced portion of the shaft at the right-hand end may be made long enough to permit the other end to clear its bearing on withdrawal of the cotter pin, so the shaft may be bodily removed for the purpose of cleaning. The shaft has a helical thread or groove 18 of V-section cut or otherwise formed therein, for the purpose of feeding the knife to be described shortly.

Ratchet teeth 19 are formed at one end of the shaft 16, the left-hand end in the illustrated embodiment, and a pawl 20 is pivoted on a pin 21 carried by the adjacent bracket 13, for co-operation therewith. The ratchet and pawl constitute a non-return or locking mechanism limiting clockwise rotation of the shaft as viewed in Figures 2, 4 and 5. It will be evident, however, that the pawl becomes effective to arrest the shaft only after it falls into one of the teeth 19. The number of teeth is small, four in the device shown, to permit limited clockwise rotation of the shaft until the pawl engages a tooth. The purpose thereof will become apparent later.

A knife 22 including a frame 23 of rod bent to the form of a bow, has an eye or sleeve 24 at one end, slidable and rotatable on the shaft 16, and a handle 25 at the other end. The ends of the rod extend laterally from the back of the bow as indicated at 26 and 27. Posts 28 and 29 depend from the laterally extending portions 26 and 27. The post 28 has its lower end slotted as at 30 to accommodate a cutting wire stretched between the posts. A knot or pin 31 at the end of the wire engages the post 28. The post 29 has a bushing 32 rotatable thereon provided with a groove 33 in which the other end of the wire is wound. The bushing may be turned to tension the wire by a nail inserted in a transverse hole 34, or the exposed end of the bushing may be slotted to receive the bit of a screw-driver. The inner end of the bushing has slots 35 spaced circumferentially thereof for co-operation with a pin 36 extending transversely from the post 29. The bushing, of course, must be moved outwardly on the post until the slotted end clears the pin before the wire can be tightened. After the desired tension has been secured, the bushing may be pushed up on the post until the pin enters one of the slots thereby serving to prevent unwinding and loosening of the wire.

The knife 22 is adapted to be manually swung upwardly and downwardly about the shaft as an axis, by means of handle 25, to execute successive cutting strokes, the article or material to be sliced being disposed on the base in the path of the cutting wire. As shown in Figure 2, the base has a convex curvature transversely thereof whereby a progressive cutting action results when the wire is forced downwardly against the metal sheathing 11. The offset of the knife frame 23 from the wire afforded by the laterally extending portions 26 and 27 provides ample clearance for the slices as they are successively cut from the main mass. They will usually fall over onto the base as the knife is swung upwardly and stack in an orderly manner so that it is unnecessary to handle them individually or even touch them until the required number of slices has been obtained.

In order to feed the knife along the screw after each cut, the sleeve 24 has a radial socket 37 extending thereinto which accommodates a plug or plunger 38 the inner end of which is turned to conical shape to fit in the thread 18. The plug thus serves as a follower traveling in the groove and is effective to advance the knife on rotation of the eye relative thereto. The follower also maintains sufficient friction between the eye and shaft to cause the latter to turn with the former until arrested by the pawl 20. The plug is constantly urged inwardly of the socket by a contractile spring 39. One end of the spring bears in a depression in the outer end of the plug and the other end is secured to the eye 24.

It will be apparent from the foregoing that the shaft 16 turns with the knife 22 as the latter is raised until it reaches an approximately vertical position. There is thus no feeding of the knife until it has cleared the article being sliced and any interference therebetween is entirely avoided. By the time the knife has reached approximately the vertical position, one of the teeth 19 will have been engaged by the pawl 20 and further rotation of the shaft prevented. Thereafter, continued swinging of the knife to the backwardly outstretched or reverse horizontal position shown in Figure 5, causes the eye to travel along the screw thus advancing the knife for the next cut. A tongue 40 extending outwardly from the sleeve 24 acts as a stop by engagement with the base to limit the backward or feeding movement of the knife. When the knife is next brought forward on the succeeding cutting stroke, the shaft turns with it through the full angle of sweep so that there is no reverse feeding.

The knife will eventually reach the left-hand end of the base after repeated cutting strokes so I provide means for resetting it at the right-hand end. For this purpose, the wall of the socket 37 is made of helical shape at the outer end as at 41, forming a side cam. A radial pin 42 projecting from the plug rides on this cam and when turned clockwise as viewed in Figure 1, causes the plug to be lifted out of engagement with the shaft. When the inner end or follower portion of the plug has thus cleared the groove in the shaft, the knife may be manually reset by sliding the eye toward the right along the shaft. When it has been restored to starting position, i. e., that shown in Figure 1, the pin 42 may be turned back thus permitting the follower to re-engage the shaft. If it does not immediately enter the groove, it will do so during the first upward or feeding stroke of the knife.

The invention is characterized by numerous advantages. It is simple in construction and inexpensive to manufacture since the parts are few and well adapted to production by automatic machines. The device is remarkably effective in performing its intended function. The cutting wire is preferably a piece of fine piano wire. Such wire has ample strength to cut even relatively tough material with but little effort. The principal advantage, of course, is the automatic screw feed which advances the knife after each cut. Slices of different thicknesses may be made by limiting the backward or feeding stroke of the knife to an angle less than the maximum permitted by the stop 40. Even when this is done by eye, the thickness of the slices may be kept substantially uniform. The device is compact, light in weight and easily cleaned so that it makes a highly desirable kitchen appliance.

Although I have illustrated and described but a preferred embodiment of the invention, it will be recognized that changes in the details or arrangement may be made without departing from the spirit of the invention or the scope of the appended claims.

I claim:

1. A food cutter comprising a base, a horizontal screw shaft rotatably journaled thereon, a sleeve slidable and rotatable on said shaft, a knife extending from said sleeve over said base and adapted to be swung upwardly therefrom and then downwardly to cut an article placed thereon, a follower in said sleeve co-operating with the thread of said shaft, and means mounted on the base effective to arrest rotation of the shaft after predetermined rotation with said sleeve on an upswing of the knife.

2. A food cutter as defined by claim 1 characterized by said arresting means being a ratchet and pawl.

3. A food cutter as defined by claim 1 characterized by said base being provided with an upwardly convex food-supporting surface.

4. A food cutter as defined by claim 1 characterized by said sleeve being provided with cam means adapted to lift said follower upon rotation thereof.

5. A food cutter as defined by claim 1 characterized by a socket on said sleeve, said follower being slidable in said socket, the wall of said socket being provided with a cam surface, and a radial member on said follower engaging said cam.

6. A food cutter comprising a base, a screw shaft journaled thereon, a sleeve slidable and rotatable on said shaft, a knife extending from said sleeve over said base, a follower in said sleeve co-operating with the thread of said shaft, and means for intermittently arresting rotation of the shaft.

7. A food cutter comprising a base, a screw shaft rotatably journaled thereon, a knife including a frame and a sleeve, said sleeve being slidable and rotatable on said shaft, a follower in said sleeve co-operating with the thread of said shaft, and means arresting rotation of said shaft at predetermined points in its rotation with said sleeve in one direction.

JOHN L. FOX.

REFERENCES CITED

The following references are of record in the file of this patent:

UNITED STATES PATENTS

| Number | Name | Date |
|---|---|---|
| Re. 17,175 | Von Glahn | Dec. 25, 1928 |
| 1,659,340 | Von Glahn | Feb. 14, 1928 |
| 1,881,623 | Jassoy | Oct. 11, 1932 |
| 2,144,557 | Youngberg | Jan. 17, 1939 |
| 2,238,186 | Pedersen | Apr. 15, 1941 |
| 2,272,042 | Samelson | Feb. 3, 1942 |
| 2,283,569 | Pedersen | May 19, 1942 |
| 2,332,307 | Dennis | Oct. 19, 1943 |

FOREIGN PATENTS

| Number | Country | Date |
|---|---|---|
| 94,196 | Germany | Oct. 12, 1897 |